United States Patent
Sauter

(10) Patent No.: US 8,301,349 B2
(45) Date of Patent: Oct. 30, 2012

(54) USE OF GRADIENT ROAD RESISTANCE STRATEGIES

(75) Inventor: Ingo-Gerd Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 761 days.

(21) Appl. No.: 12/418,558

(22) Filed: Apr. 3, 2009

(65) Prior Publication Data
US 2010/0256883 A1 Oct. 7, 2010

(51) Int. Cl.
*G06F 17/00* (2006.01)
*G06F 7/00* (2006.01)

(52) U.S. Cl. ............ 701/62; 701/53; 701/54; 701/58; 701/61; 701/65; 701/101; 701/103

(58) Field of Classification Search ............ 701/53, 701/54, 58, 61, 62, 65, 101, 103
See application file for complete search history.

(56) References Cited

U.S. PATENT DOCUMENTS

| | | | | |
|---|---|---|---|---|
| 3,593,599 A * | 7/1971 | Dach | ............. | 477/128 |
| 4,713,764 A * | 12/1987 | Klatt | ............. | 701/65 |
| 5,036,730 A * | 8/1991 | Sakai et al. | ............. | 701/57 |
| 5,611,748 A * | 3/1997 | Kashiwabara | ............. | 477/47 |
| 5,703,776 A * | 12/1997 | Soung | ............. | 701/65 |
| 5,716,301 A * | 2/1998 | Wild et al. | ............. | 477/97 |
| 5,832,400 A * | 11/1998 | Takahashi et al. | ............. | 701/53 |
| 6,019,701 A * | 2/2000 | Mori et al. | ............. | 477/46 |
| 6,029,107 A * | 2/2000 | Sato | ............. | 701/58 |
| 6,244,986 B1 * | 6/2001 | Mori et al. | ............. | 477/46 |
| 6,500,091 B2 * | 12/2002 | Yeo | ............. | 477/97 |
| 7,014,592 B2 * | 3/2006 | Wiethe et al. | ............. | 477/120 |
| RE39,684 E * | 6/2007 | Ohnishi et al. | ............. | 701/55 |
| 2003/0130780 A1 * | 7/2003 | Shiimado et al. | ............. | 701/65 |
| 2004/0097328 A1 * | 5/2004 | Makiyama et al. | ............. | 477/43 |
| 2004/0249542 A1 * | 12/2004 | Murasugi et al. | ............. | 701/51 |
| 2006/0030456 A1 * | 2/2006 | Kitamura et al. | ............. | 477/155 |
| 2006/0161330 A1 * | 7/2006 | Lupo | ............. | 701/93 |
| 2008/0125946 A1 * | 5/2008 | Fakler et al. | ............. | 701/62 |
| 2008/0177451 A1 * | 7/2008 | Saitou et al. | ............. | 701/55 |
| 2009/0076691 A1 * | 3/2009 | Burke et al. | ............. | 701/54 |
| 2010/0185370 A1 * | 7/2010 | Wurthner et al. | ............. | 701/61 |

* cited by examiner

*Primary Examiner* — Khoi Tran
*Assistant Examiner* — Jorge Peche
(74) *Attorney, Agent, or Firm* — Brinks Hofer Gilson & Lione

(57) ABSTRACT

A control method and system for a vehicle transmission that incorporates gradient road resistance in selecting an appropriate gear ratio for an automatic manual transmission or an automatic transmission are disclosed. The traction resistance of a vehicle is calculated in order to determine the traction force required for maintaining, increasing, or decreasing vehicle speed in response to operator input. Traction resistance may be a function of rolling resistance, air resistance, and the component of the gravitational force acting parallel to the road surface. The change in traction resistance is also determined. The calculated traction resistance and change in traction resistance may advantageously be used to calculate an offset to a shift point motor speed in order to delay or advance a transmission upshift when climbing a grade.

5 Claims, 7 Drawing Sheets

USE OF GRADIENT ROAD RESISTANCE STRATEGIES

TECHNICAL FIELD

This application relates generally to control methods for vehicle transmissions and more specifically, strategies for use of gradient road resistance in a vehicle system.

BACKGROUND

Automated mechanical transmissions (AMTs) continue to increase their market penetration in vehicles used in commercial traffic such as the transport of heavy cargo loads. Such transmission systems generally comprise a multi-speed mechanical transmission having a mechanical transducer or actuator assembly, which receives signals from a controller or microprocessor and transmits corresponding mechanical commands to the shift and gear components of the transmission. The controller or microprocessor receives data from a plurality of sensors such as an operator controlled shift device, a throttle position sensor, an engine and various shaft speed sensors and other operating and vehicle parameter sensors and, according to various operating algorithms, calculations, lookup tables and the like, determines an appropriate transmission gear ratio and selects or maintains that gear ratio.

Determination of the appropriate gear ratio for a variety of vehicle operating conditions is important to the efficient operation of the vehicle. While the sophistication of AMT controllers continues to improve, some controllers on occasion incorrectly determine that a transmission gear ratio change is required. Transmission hunting, a cyclic repetition of gear shifts between adjacent gear ratios, is one example of such erroneous determinations by the AMT controller. In transmission hunting, a controller may erroneously determine that a shift to another gear ratio is required. Shortly after the shift is completed, the controller may then determine that a shift back to the previous gear ratio is required. Transmission hunting may occur when climbing a hill or grade. As a result of incorrect gear ratio change determinations, travelling comfort of the vehicle passengers may be reduced, and the fuel efficiency of the vehicle can decrease.

BRIEF SUMMARY

Therefore, it would be advantageous if the controller could incorporate additional vehicle operating conditions when determining if a transmission gear ratio change is required. Specifically, a controller that incorporates the grade of the surface the vehicle is travelling on, and the change in the grade, may more optimally determine a motor speed at which a transmission gear ratio change should occur.

In one embodiment, there is a method for determining a shift point motor speed corresponding to a transmission gear ratio change of a vehicle on a grade. A first shift point motor speed corresponding to a transmission gear ratio change for a vehicle on a level surface is determined. A first offset value based on a traction resistance of the vehicle on a grade is determined. A second offset value based on a change in the traction resistance of the vehicle is determined. In one implementation, the second offset value is negative if the change in the traction resistance is negative, and the second offset value is positive if the change in the traction resistance is positive. The first shift point motor speed is adjusted by the first offset value to yield a second shift point motor speed. The second shift point motor speed may be adjusted by the second offset value to yield an adjusted shift point motor speed corresponding to a transmission gear ratio change of the vehicle on the grade.

In another embodiment, there is a method for determining a shift point motor speed corresponding to a transmission gear ratio change of a vehicle on a grade. A shift point motor speed is determined corresponding to a transmission gear ratio change for a vehicle on a level surface. An offset value is determined based on the change in a traction resistance of the vehicle on a grade. The shift point motor speed is adjusted by the offset value to yield an adjusted shift point motor speed corresponding to a transmission gear ratio change of the vehicle on the grade. In one implementation, the offset value is negative if the change in the traction resistance is negative, and the offset value is positive if the change in the traction resistance is positive. In another implementation, an additional offset value may be based on a traction resistance of the vehicle on the grade, and the shift point motor speed may be adjusted by the additional offset value prior to adjusting the shift point motor speed by the offset value.

In another embodiment, a vehicle is disclosed. The vehicle includes a prime mover, a transmission that can couple power from the prime mover to a transmission output at a number of different gear ratios, a sensor that can measure a value indicative of a traction resistance of the vehicle on a grade, and a controller, in communication with the sensor and the transmission. The controller can select a first gear ratio of the transmission, select a second gear ratio of the transmission when a motor speed of the prime mover is about equal to a shift point motor speed, and determine the shift point motor speed. The controller can determine the shift point motor speed by determining a first shift point motor speed corresponding to a transmission gear ratio change for the vehicle on a level surface, receiving from the sensor the value indicative of the traction resistance, determining a first offset value based on the traction resistance of the vehicle on the grade, determining a second offset value based on the change in the traction resistance of the vehicle, adjusting the first shift point motor speed by the first offset value to yield a second shift point motor speed, and adjusting the second shift point motor speed by the second offset value to yield the shift point motor speed corresponding to a transmission gear ratio change of the vehicle on the grade from the first gear ratio to the second gear ratio. In one implementation, the controller is further operative to determine the traction resistance and the change in traction resistance of the vehicle. In another implementation, the vehicle also includes a lookup table containing first and second offset values that the controller may retrieve when determining the first offset value and second offset value corresponding to the traction resistance and the change in traction resistance.

Other embodiments, and features and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

DETAILED DESCRIPTION OF THE DRAWINGS AND THE PRESENTLY PREFERRED EMBODIMENTS

A controller or microprocessor in a vehicle may select the motor speed at which a transmission gear ratio is changed. A transmission gear ratio change may occur for a number of reasons, such as in response to operator throttle input, a change in the required torque to achieve a desired vehicle speed or acceleration, or because the motor speed in a given gear ratio exceeds a maximum or is below a minimum predetermined value. Occasionally, a controller may incorrectly determine that a transmission gear ratio change is required. In these situations, the controller may change the transmission gear ratio to a new gear ratio, only to change the gear ratio back to the previous gear ratio a short time later. This erroneous shifting (changing of gear ratios) is generally undesirable, and occurrences of an erroneous shift may be reduced if the controller can more accurately determine when a shift is required.

To improve the accuracy of the determination, a transmission controller can incorporate additional vehicle operating conditions when determining if a transmission gear ratio change is required. Specifically, a controller that incorporates the grade of the surface on which the vehicle is travelling, and the change in the grade, may more optimally determine a motor speed at which a transmission gear ratio change should occur. The grade of a road surface is a measure of steepness of the road surface, and can also be referred to as the slope or degree of incline. Methods and systems for incorporating this additional information into a transmission controller are described below in the figures and accompanying text.

Figure 1:
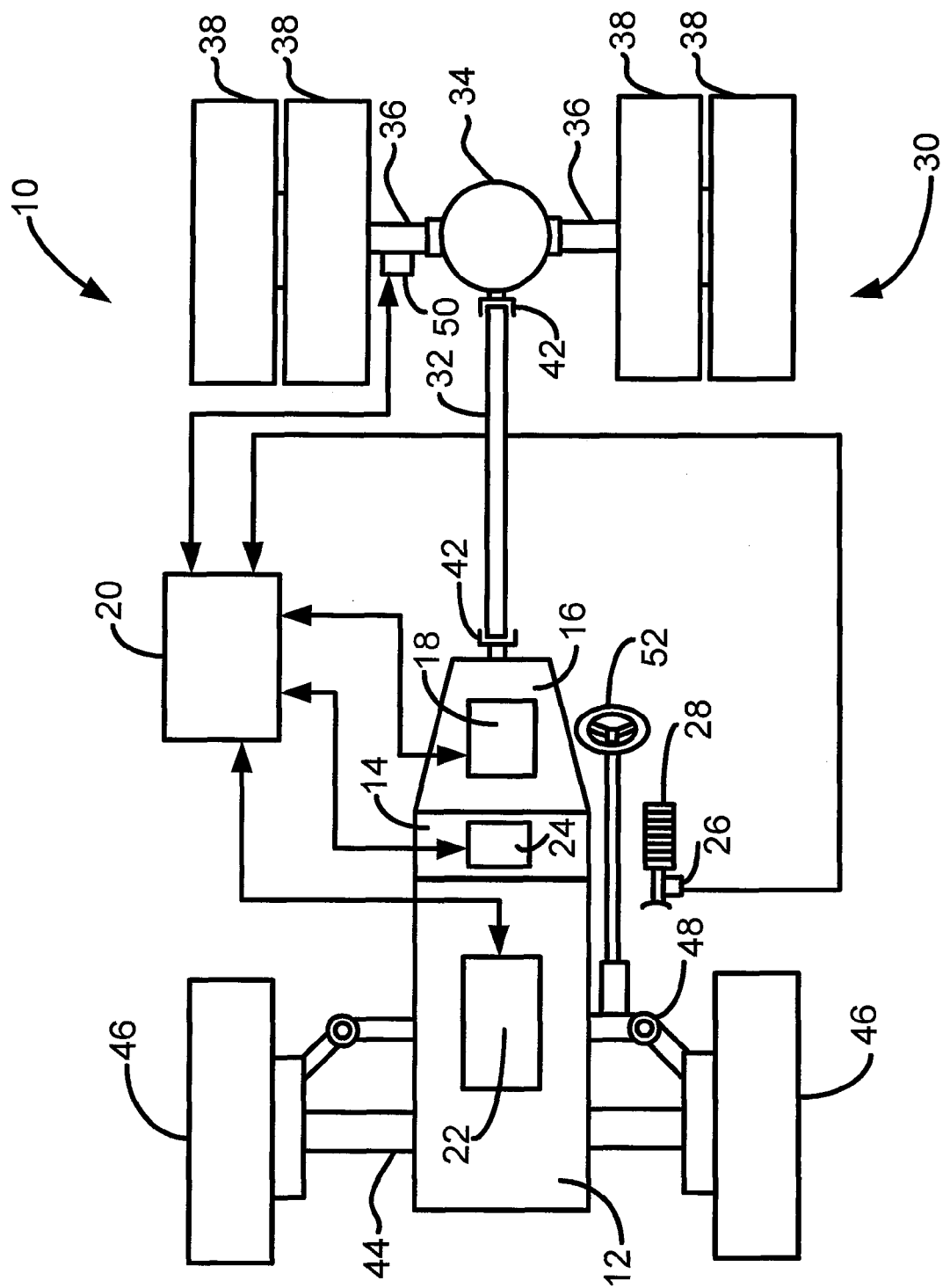
FIG. 1 is a diagram illustrating an exemplary vehicle.

FIG. 1 is a diagram illustrating an exemplary vehicle. The vehicle 10 includes a prime mover 12, also referred to as a motor, which may be an internal combustion gas, natural gas, or diesel engine. In some embodiments, the prime mover 12 is an electric motor. In other embodiments, the prime mover 12 may be a combination of any two power sources, such as an electric motor and an internal combustion engine, that individually or cooperatively provide power to move the vehicle 10. Vehicles containing two or more power sources are often referred to as hybrid vehicles. In one embodiment, an output of the prime mover 12 may be having an output provided directly to a master friction clutch 14.

The master friction clutch 14 selectively and positively engages some or all of the power output of the prime mover 12 to an input of a multiple speed gear change transmission 16. While not shown in FIG. 1, in some hybrid vehicle embodiments, the master friction clutch 14 may decouple the power output of one power source of the prime mover 12, such as an internal combustion engine, from an input of the transmission 16, while allowing the power output of a second power source of the prime mover 12, such as an electric motor, to remain coupled to a transmission input. In one such configuration, an internal combustion engine may be coupled to the vehicle drivetrain upstream of the master friction clutch 14, while an electric motor may be coupled to the vehicle drivetrain downstream of the master friction clutch 14. The transmission 16 may be of the type currently referred to as an automated mechanical transmission (AMT), wherein gear or speed ratio changes of a transmission system are achieved by an automated (i.e., electric, hydraulic or pneumatic) shift and actuator assembly 18 under the control of a master microprocessor or controller 20. The transmission system may include a main transmission as well as a splitter and/or planetary gear assembly.

The master microprocessor or controller 20 also includes a data and control link to a motor controller 22, which will typically include a motor speed sensor and a fuel control or other power metering device, such as a throttle, capable of adjusting and controlling the speed or power output of the prime mover 12. In one embodiment, the controller 20 includes a driving speed control unit to adjust or maintain the speed of the vehicle 10. The master controller 20 may also provide control signals to a master friction clutch operator assembly 24, which controls the engagement and disengagement of the master friction clutch 14. A throttle position sensor 26 senses the position of a vehicle throttle, power metering device, or accelerator pedal 28 and may provide real time data regarding the setting of a prime mover power metering device or position of the throttle pedal 28 to the master controller 20. A vehicle speed sensor 50 may provide an input indicative of the number of revolutions of the axle 36 (and thus the wheels 38) per unit of time, which may be used by the master controller 20 to compute the real-time speed of the vehicle 10. In another embodiment, the vehicle speed sensor 50 is a wheel speed sensing component of a vehicle braking system, such as an anti-lock braking system (ABS) or an electronic braking system (EBS), and provides an input indicative of the wheel speed.

The master microprocessor or controller 20 and all of its components may be implemented in hardware, such as circuitry suitable to implement the functionality as described herein, software (which may include firmware), or a combination of hardware and software. In one embodiment, the controller 20 may incorporate other functionality, and therefore may also monitor and control other systems of the vehicle 10 in addition to the transmission 16. In another embodiment, the controller 20 primarily monitors the transmission 16 and controls the selection of gears or speed ratios of main transmission, splitter and planetary gear assembly, and may exchange commands and status messages with other microprocessors or controllers in the vehicle 10.

The output of the transmission 16 is provided to a driveline assembly 30, which includes a propshaft 32 that drives a differential 34. The differential 34 provides drive torque to a pair of axles 36, which are in turn coupled to rear left and right tire and wheel assemblies 38. The tire and wheel assemblies may be either a dual configuration as illustrated or a single left and right tire and wheel assembly. Suitable universal joints 42 may be utilized as necessary with the rear propshaft 32 to accommodate static and dynamic offsets and misalignments thereof. An axle 44 pivotally supports a pair of front tire and wheel assemblies 46, which are controllably pivoted by a steering linkage 48 coupled to and positioned by a steering wheel 52. Other embodiments of the vehicle 10 are also possible, including configurations in which the front tire and wheel assemblies 46 are driven by the prime mover 12 through the driveline assembly 30 and the rear left and right tire and wheel assemblies 38 are not driven, as well as configurations in which all of the wheels 46 and 38 are driven by the prime mover 12 through the driveline assembly 30.

Figure 2:
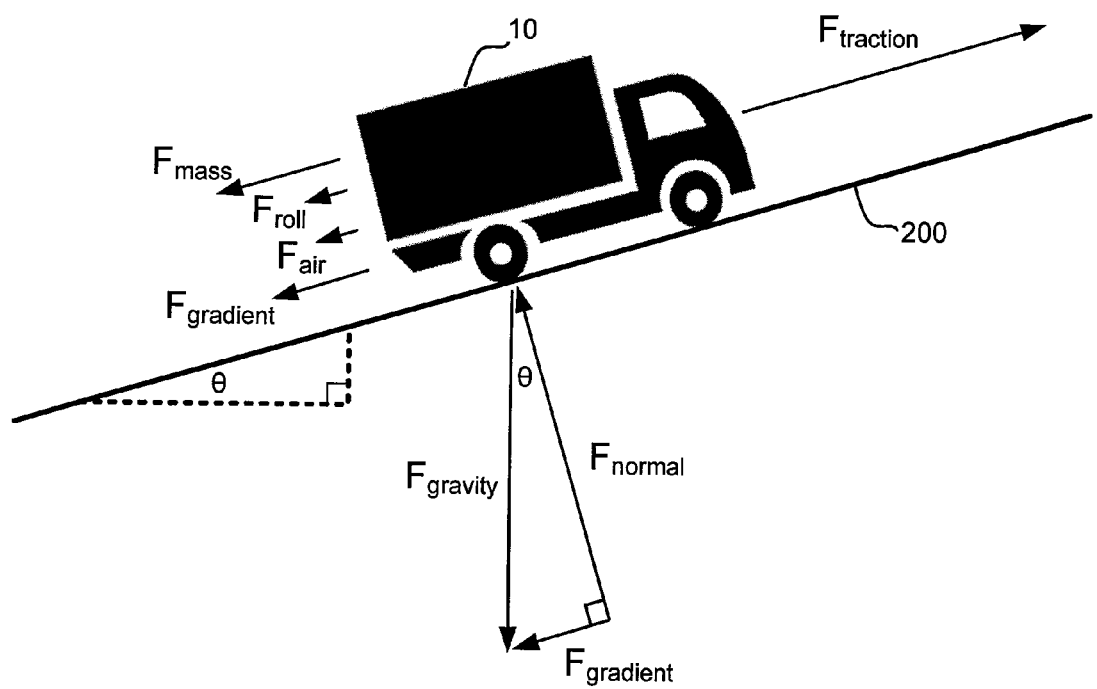
FIG. 2 is a diagram illustrating the forces acting on a vehicle ascending a grade.

FIG. 2 illustrates the forces acting on a vehicle ascending a grade 200. The prime mover 12 of the vehicle 10 supplies a traction force at the wheels 38. This force is opposed by the rolling resistance and wind resistance of the vehicle, as well as the component of the gravitational force that is parallel to the road surface. The remaining force may be used to accelerate or decelerate the vehicle on the grade 200. This force relationship is shown in the following equation:

$$F_{traction} = F_{mass} + F_{roll} + F_{air} + F_{gradient} \quad (1)$$

In equation 1, $F_{traction}$ is the traction force supplied by the motor 12 through the transmission 16 and the differential 34, $F_{roll}$ is the rolling resistance of the vehicle, $F_{air}$ is the wind resistance of the vehicle 10, $F_{gradient}$ is the component of the gravitational force that is parallel to the road surface. The remaining force, $F_{mass}$, is the mass force of inertia, or the force available to accelerate the inertial mass $m_i$ of the vehicle at a rate of a. This is illustrated by rearranging equation 1:

$$F_{traction} - (F_{roll} + F_{air} + F_{gradient}) = F_{mass} = m_i a \quad (2)$$

When acceleration is zero, the vehicle speed is constant and equation 2 reduces to the following:

$$F_{traction} = F_{roll} + F_{air} + F_{gradient} \quad (3)$$

As shown in FIG. 2, the force of gravity acting on the vehicle can be divided into a force component that is normal to the road surface 200, and a force component that is parallel to the road surface:

$$F_{gravity} = F_{gradient} + F_{normal} \quad (4)$$

The degree of incline of a road surface 200 is sometimes referred to as the road grade or road gradient, a percentage indicative of the slope of the road surface 200:

$$\text{road grade} = \tan\theta * 100\% = \text{slope} * 100\% \quad (5)$$

The road grade may be used to determine $F_{gradient}$ according to the following equations:

$$\sin\theta = F_{gradient}/F_{gravity} \quad (6)$$

$$F_{gradient} = F_{gravity} * \sin\theta \quad (7)$$

Thus the traction force required to maintain the speed of a vehicle 10 on a road surface 200 is dependent on the road grade, as shown by substituting $F_{gradient}$ from equation 7 into equation 3:

$$F_{traction} = F_{roll} + F_{air} + (F_{gravity} * \sin\theta) \quad (8)$$

When climbing a grade, the gradient force is generally larger than the rolling resistance and air resistance. However, inspection of equation 8 shows that if θ is zero (such as when the vehicle is on a level road surface), then the gradient force is zero. The traction force supplied by the prime mover is dependent on the torque output of the motor at a given motor speed and throttle input, multiplied by the gearing ratio of the differential 34 (i.e., the number of revolutions of the axles 36 per revolution of the propshaft 32), and the selectable gear ratio of the transmission 16. The gear ratio of the transmission 16 equals the number of revolutions of the transmission input shaft per revolution of the transmission output shaft. The torque output of the motor 12 is multiplied according to the gear ratio of the transmission 16. Thus, selection of the correct gear ratio depends on the traction force required, and thus, the grade of the road surface 200 on which the vehicle 10 is traveling. The available gear ratios can be limited by other factors, such as the maximum and minimum permissible speeds of the prime mover 12.

Figure 3A:
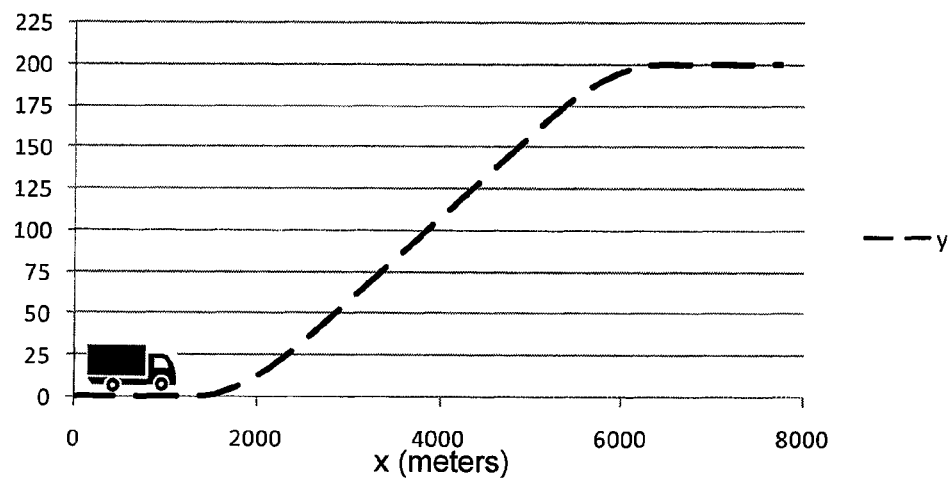
FIG. 3A is a graph illustrating a profile view of a vehicle ascending an exemplary grade.

The amount of traction force required may depend on the current state of the vehicle in climbing a grade or hill. A vehicle 10 ascent of a hill may be divided into stages. FIG. 3A is a graph illustrating a profile view of a vehicle ascending an exemplary grade 200. The y-axis of the graph is the change in altitude of the vehicle 10 as the grade as ascended. The x-axis shows the horizontal displacement of the vehicle 10 from the starting point. As shown in FIG. 3A, there typically are three stages in ascending a grade. In the first stage, shown at about 2000 meters, the slope of the road surface increases from zero. At a second stage, shown between approximately 3000 and 5000 meters, the slope of the grade 200 is relatively constant. At a third stage, shown at about 6000 meters, the slope of the grade decreases to zero, and the climb is completed.

Figure 3B:
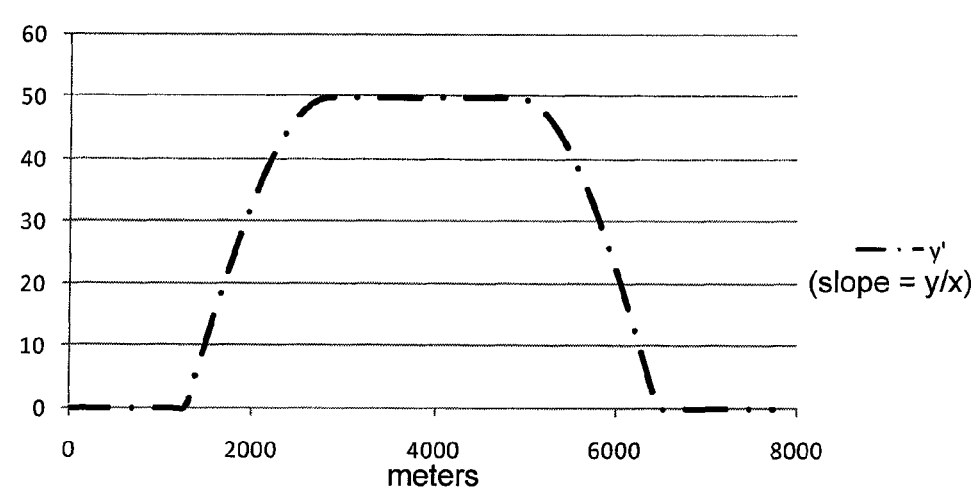
FIG. 3B is a graph illustrating the slope of the exemplary grade shown in FIG. 3A.

FIG. 3B is a graph illustrating the slope of the exemplary grade 200 shown in FIG. 3A. The y-axis of the graph is the change in altitude of the vehicle per 1000 meters of horizontal travel. The x-axis shows the horizontal displacement of the vehicle 10 from the starting point using the same scale as shown in FIG. 3A. FIG. 3B more clearly shows the three stages in the climb of the exemplary grade 200: 1) increasing slope from zero to a constant value, 2) holding slope at a constant value and 3) decreasing slope from the constant value back to zero.

Figure 3C:
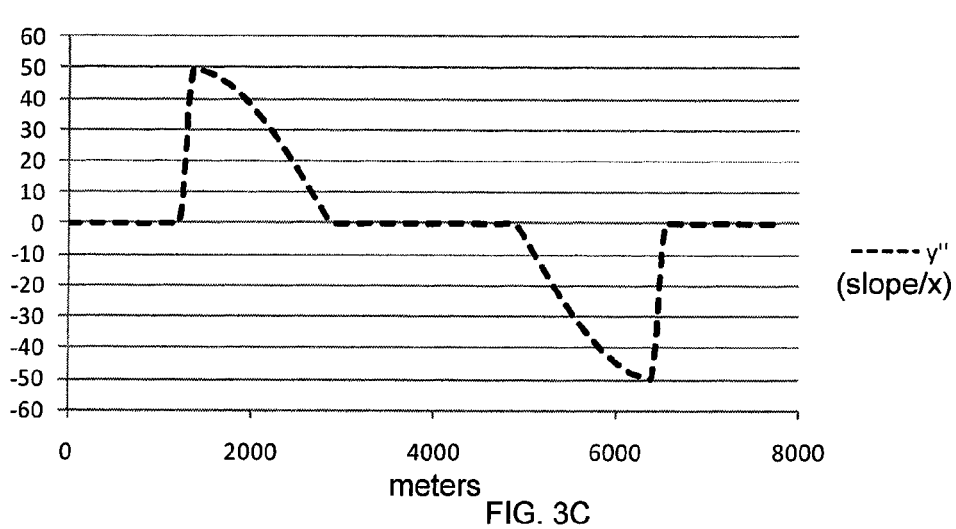
FIG. 3C is a graph illustrating the change in slope of the exemplary grade shown in FIG. 3A.

FIG. 3C is a graph illustrating the change in slope of the exemplary grade 200 shown in FIG. 3A. The y-axis of the graph is the change in slope of the grade per 1000 meters of displacement along the x-axis. The x-axis shows the horizontal displacement of the vehicle 10 from the starting point using the same scale as shown in FIG. 3A. FIG. 3C more clearly shows how the slope rapidly increases at the beginning of the climb the exemplary grade 200, stays unchanged in the middle of the climb, and decreases rapidly at the end of the climb.

As previously stated, the traction force required to maintain the speed of a vehicle 10 on a road surface 200 is dependent on the road grade can be determined using the following equation:

$$F_{traction} = F_{roll} + F_{air} + (F_{gravity} * \sin\theta) \quad (9)$$

By rearranging equation 5, the value of θ can be expressed in terms of the slope of the grade 200:

$$\text{slope} = \tan\theta \quad (10)$$

$$\theta = \tan^{-1}(\text{slope}) \quad (11)$$

Substituting for θ in equation 9 using the value shown in equation 11, the required traction force can expressed as follows.

$$F_{traction} = F_{roll} + F_{air} + (F_{gravity} * \sin(\tan^{-1}(\text{slope}))) \quad (12)$$

The controller 20 may select an appropriate gear ratio for the transmission 16 depending on the traction requirement. Table 1 shows gear ratios of an exemplary transmission:

TABLE 1

| Gear Number | Gear Ratio |
| --- | --- |
| 1st gear | 5.79:1 |
| 2nd gear | 3.30:1 |
| 3rd gear | 2.10:1 |
| 4th gear | 1.31:1 |

TABLE 1-continued

| Gear Number | Gear Ratio |
|---|---|
| 5th gear | 1.00:1 |
| 6th gear | 0.72:1 |
| Reverse | 5.23:1 |

A transmission upshift is defined as a change from a higher gear ratio to a lower gear ratio. For example, referring to Table 1, an upshift from first gear to second gear changes the transmission gear ratio from 5:79:1 to 3.30:1. A transmission downshift is defined as a change from a lower gear ratio to higher gear ratio. For example, referring again to Table 1, a downshift from fourth gear to third gear changes the transmission gear ratio from 1:31:1 to 2.10:1. In one embodiment, the controller 20 increases or maintains the traction force available by delaying a transmission upshift. Delaying a transmission upshift may be accomplished by increasing the motor speed at which an upshift occurs, through adding an offset to the shift point motor speed. This first offset may be dependent on the slope of the road surface 200.

Figure 4:
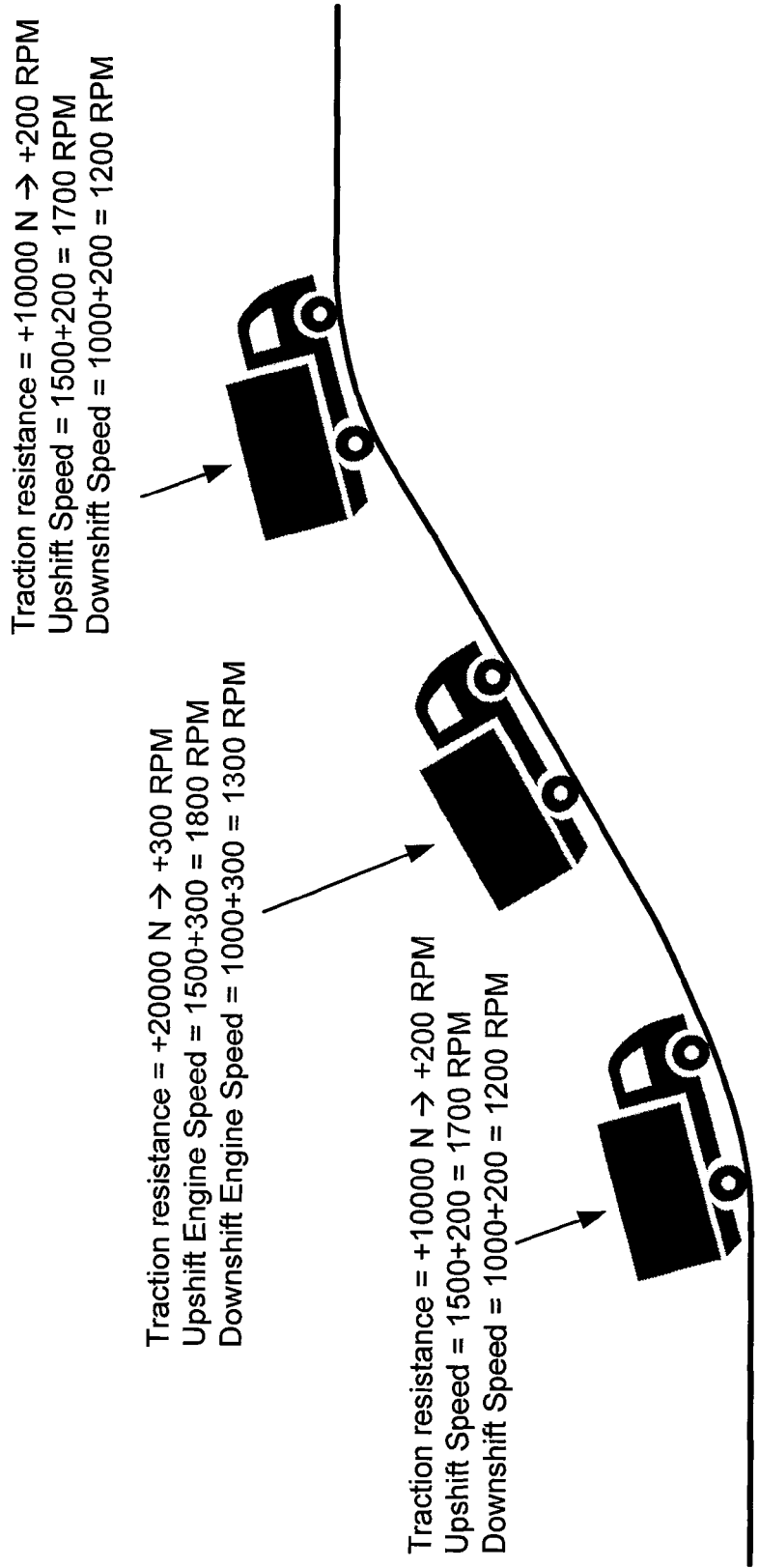
FIG. 4 shows the results of exemplary calculations of an adjusted shift point motor speed during a vehicle hill climb.

FIG. 4 shows the results of exemplary calculations of an adjusted shift point motor speed during a vehicle hill climb. On a level surface, the vehicle transmission downshifts at a motor speed of 1000 revolutions per minute, and upshifts at a motor speed of 1500 revolutions per minute. Table 2 shows an exemplary first offset adjustment to a shift point motor speed based on a calculated traction resistance when ascending a grade 200.

TABLE 2

| Traction resistance [N] | 0 | 5000 | 10000 | 20000 | 30000 |
|---|---|---|---|---|---|
| Number of revolutions offset [1/min] | 0 | 100 | 200 | 300 | 400 |

The offset adjustment table may be stored in a memory in the controller 20 or are otherwise accessible to the controller 20. In the first situation shown in FIG. 4, the vehicle 10 is beginning to climb the hill. The traction resistance is determined to be 10000N. The controller 20 may utilize the information in Table 2 to determine that a positive offset to the shift point motor speed is required based on the current traction resistance. Hence, an offset value of 200 revolutions per minute is added to the downshift shift point motor speed of 1000 revolutions per minute, to yield a downshift adjusted shift point motor speed of 1200 revolutions per minute. This adjustment to the downshift speed facilitates a downshift if the vehicle approaches the base of a grade with a motor speed at the lower end of the operating range. When the prime mover includes an internal combustion engine, the early downshift may avoid engine lugging if motor speed drops as the vehicle transitions from a flat surface to a grade. Similarly, an offset value of 200 revolutions per minute is added to the upshift shift point motor speed of 1500 revolutions per minute, to yield an upshift adjusted shift point motor speed of 1700 revolutions per minute. This adjustment acts to avoid an undesirable upshift (with a corresponding loss of torque and thus traction force at the wheels) that may have occurred just as the vehicle begins to climb a hill.

In the second situation shown in FIG. 4, the vehicle 10 is in the middle of climbing the hill. The traction resistance is determined to be 20000N. The controller 20 may determine that a positive offset to the shift point motor speed is required based on the current traction resistance. Hence, an offset value of 300 revolutions per minute is added to the downshift shift point motor speed of 1000 revolutions per minute, to yield a downshift adjusted shift point motor speed of 1300 revolutions per minute. Similarly, an offset value of 300 revolutions per minute is added to the upshift shift point motor speed of 1500 revolutions per minute, to yield an upshift adjusted shift point motor speed of 1800 revolutions per minute. This adjustment acts to avoid or delay an undesirable upshift (with a corresponding loss of torque and thus traction power at the wheels) that may have occurred if the original shift point motor speed was used to determine when an upshift should occur. Stated another way, whereas an earlier upshift may be appropriate on level ground in order to improve fuel economy, a delayed upshift may increase the traction force available to the vehicle when climbing a grade 200 by allowing the transmission to remain in a lower gear, at the expense of a higher motor speed and reduced fuel economy.

In the third situation shown in FIG. 4, the vehicle 10 has nearly completed climbing the grade. The traction resistance is determined to be 10000N. The controller 20 may determine that a positive offset to the shift point motor speed is required based on the current traction resistance. Hence, an offset value of 200 revolutions per minute is added to the downshift shift point motor speed of 1000 revolutions per minute to yield a downshift adjusted shift point motor speed of 1200 revolutions per minute. This adjustment to the downshift motor speed facilitates a downshift if the vehicle motor speed approaches the lower end of the operating range. When the prime mover includes an internal combustion engine, the early downshift may avoid engine lugging if motor speed drops as the vehicle travels up the grade. Similarly, an offset value of 200 revolutions per minute is added to the upshift shift point motor speed of 1500 revolutions per minute to yield an upshift adjusted shift point motor speed of 1700 revolutions per minute. As in the first situation, the adjustment acts to avoid an undesirable upshift (with a corresponding loss of torque and thus traction power at the wheels) while the vehicle is still climbing the grade.

The adjusted shift point motor speeds in the first and third situations are equal. In each situation, the upshift adjusted shift point motor speed is 1700 revolutions per minute, and the downshift adjusted shift point motor speed is 1200 revolutions per minute. In one embodiment, the controller 20 may advantageously incorporate additional information when calculating adjusted shift point motor speeds to more accurately reflect the vehicle operating conditions. At the beginning and the end of the hill climb, the slope may change relative rapidly, depending on the velocity of the vehicle 10, and thus, the traction force required to counteract the changing gradient force may also vary, as shown in the equations 13 and 14.

$$F_{gradient} = F_{gravity} * \sin(\tan^{-1}(\text{slope})) \tag{13}$$

$$\Delta F_{gradient} = F_{gravity} * \sin(\tan^{-1}(\Delta \text{slope})) \tag{14}$$

At the beginning of a hill climb, a transmission upshift (changing the numerical gear ratio of the transmission to a lower value) may be undesirable, as additional traction force may soon be required for the increasing slope of the road surface 200. At the end of a hill climb, a transmission downshift (changing the numerical gear ratio of the transmission to a higher value) may be undesirable, as the vehicle may require less traction force to maintain a relatively constant speed on the decreasing slope of the road surface 200. The unnecessary transmission downshift may also increase fuel consumption and thus, reduce fuel economy. At the end of a hill climb, an earlier transmission upshift in anticipation of the decreasing slope of the road surface 200 (and thus decreasing torque requirement) may be desirable to improve the fuel efficiency of the vehicle. Alternatively, the offset added to the shift point motor speed due to the slope of the road surface may be reduced because the slope is decreasing at the end of the hill climb. Thus, in one embodiment, the controller 20 increases or decreases the traction force available by delaying or advancing a transmission gear ratio change. This may be accomplished by adjusting the shift point motor speed by a second offset based on the change in the slope of the road surface 200.

Figure 5A:
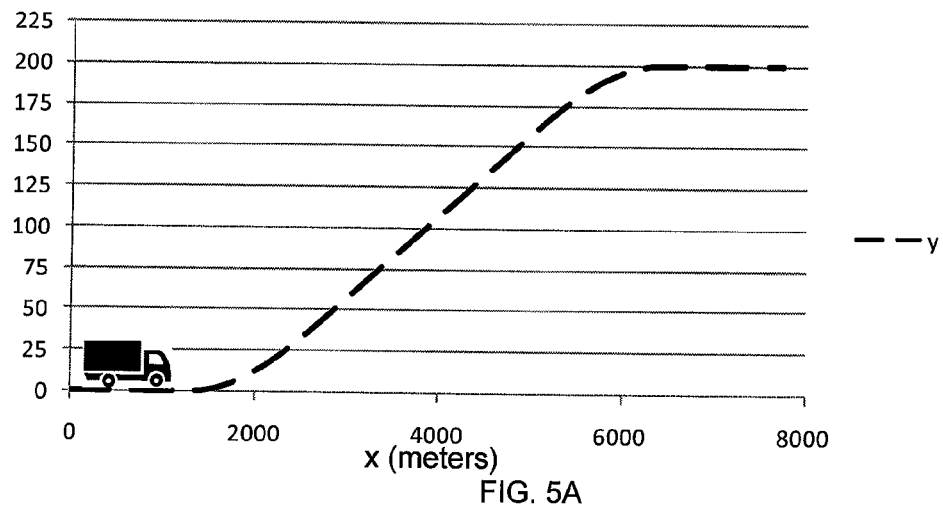
FIG. 5A is a graph illustrating a profile view of a vehicle ascending an exemplary grade.

The change in traction force required to maintain the vehicle speed may be better understood by examining the gradient force and the change in gradient force on the vehicle 10 as it ascends the grade 200. FIG. 5A is a graph illustrating a profile view of a vehicle ascending an exemplary grade 200. The y-axis of the graph is the change in altitude of the vehicle 10 as the grade as ascended. The x-axis shows the horizontal displacement of the vehicle 10 from the starting point. FIG. 5A illustrates the three stages in ascending a typical grade. In the first stage, shown at around 2000 meters, the slope of the road surface increases from zero. At a second stage, shown between approximately 3000 and 5000 meters, the slope of the grade 200 is relatively constant. At a third stage, shown at about 6000 meters, the slope of the grade decreases to zero, and the climb is completed.

Figure 5B:
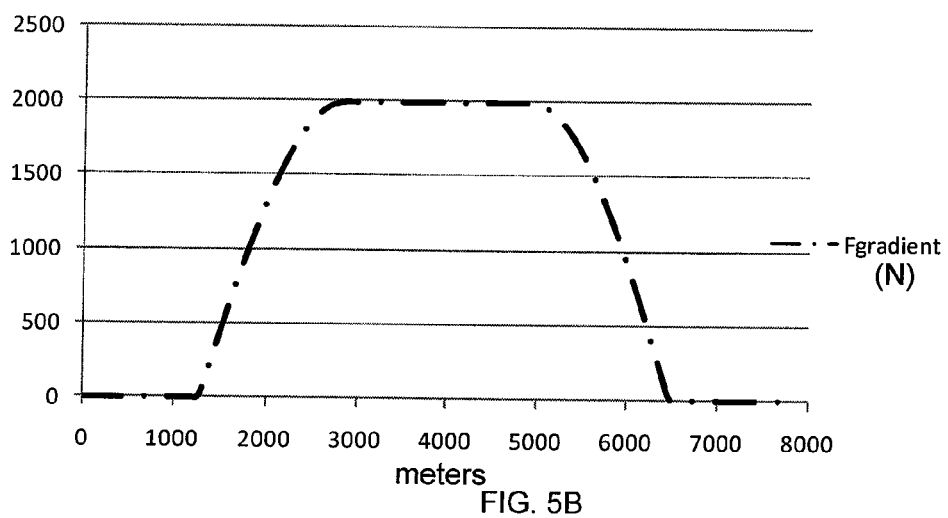
FIG. 5B is a graph illustrating the gradient force acting on the vehicle ascending the exemplary grade shown in FIG. 5A.

FIG. 5B is a graph illustrating the gradient force acting on the vehicle 10 ascending the exemplary grade shown in FIG. 5A. In the figure, it is assumed that $F_{gravity}$ is equal to 40,000N (thus, the mass of the vehicle is approximately 4081 kg). The y-axis of the graph is $F_{gradient}$, the component of the gravitational force that is parallel to the road surface at a given horizontal displacement of the vehicle 10 from the starting point, using the same scale as shown in FIG. 5A. As the vehicle ascends the grade 200, $F_{gradient}$ increases from zero to 2000N. Thus, at about the middle of the hill (4000 meters on the x-axis of the graph, $F_{traction}$ must be at least 2000N to maintain the current velocity of the vehicle 10. As the vehicle nears the top of the grade, $F_{gradient}$ decreases back to zero as the hill climb is completed.

Figure 5C:
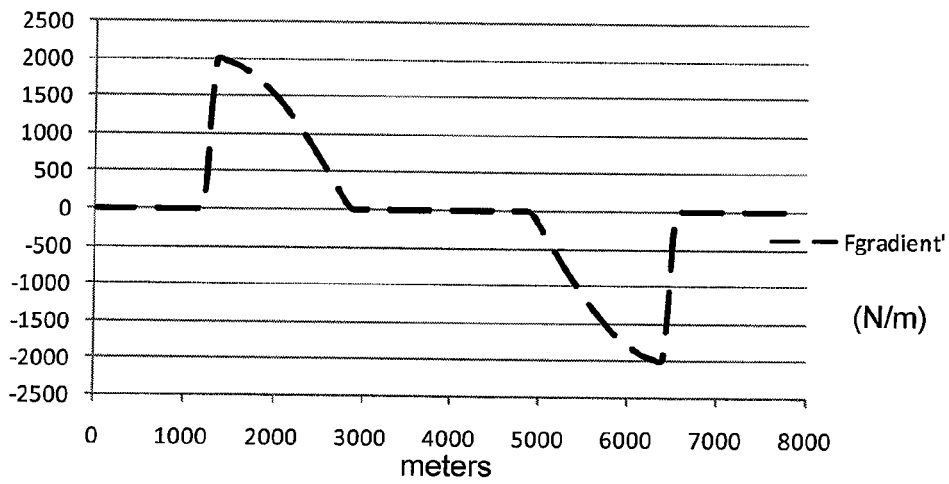
FIG. 5C is a graph illustrating the change gradient force acting on the vehicle ascending the exemplary grade shown in FIG. 5A.

FIG. 5C is a graph illustrating the change in gradient force acting on the vehicle 10 ascending the exemplary grade shown in FIG. 5A. In the figure, it is assumed that $F_{gravity}$ is equal to 40,000N (thus, the mass of the vehicle is approximately 4081 kg). The y-axis of the graph is $F_{gradient}'$, the change in the component of the gravitational force that is parallel to the road surface per 1000 meters of horizontal displacement of the vehicle 10 from the starting point, using the same scale as shown in FIG. 5A. FIG. 4C shows that for the exemplary grade 200 shown in FIG. 5A, the gradient force rapidly increases at the beginning of a hill climb, remains constant in the middle of the hill climb, and decreases rapidly at the end of the climb. Because $F_{gradient}'$ is expressed in N/1000 m, multiplying this value by the vehicle speed (expressed in km/s) provides a more useful measure (expressed in N/s) of how quickly the controller 20 may need to react to changes in the gradient force when selecting the correct gear ratio.

The gradient force $F_{gradient}$ may be measured using a variety of techniques. If the vehicle mass (m) and the slope of the grade is known (such as by weighing a vehicle and receiving measurements from an inclinometer), $F_{gradient}$ may be calculated using the following equations:

$$F_{gradient} = F_{gravity} * \sin(\tan^{-1}(\text{slope})) \quad (15)$$

$$F_{gradient} = m * g * \sin(\tan^{-1}(\text{slope})) \quad (16)$$

The change gradient force $F_{gradient}'$ may be computed using a number of techniques that approximate taking a derivative of a function. However, this technique may still require the controller to determine the rolling resistance $F_{roll}$ and the air resistance $F_{air}$ in order to determine the traction force $F_{traction}$ required to maintain the vehicle speed. Equation 1, which shows the forces acting on the vehicle 10 shown in FIG. 2, can be rearranged to more readily calculate the sum of $F_{gradient}$, $F_{roll}$ and $F_{air}$:

$$F_{traction} - F_{mass} = F_{traction} - m_i a = F_{roll} + F_{air} + F_{gradient} \quad (17)$$

The controller 20 may compute $F_{traction}$ based on known properties of the system, including the throttle position, motor speed, transmission 16 gear ratio, differential 34 gear ratio, and tire diameter. A change in speed as measured by the vehicle speed sensor 50 may be used to determine vehicle acceleration. Finally, the inertial mass of the vehicle $m_i$ may be computed using a variety of techniques, such as measuring the acceleration of the vehicle on a level surface (where $F_{gradient}$ is about zero) and at a low speed (where $F_{air}$ is about zero). The sum of $F_{roll}$, $F_{air}$, and $F_{gradient}$ may be referred to as the traction resistance. The change in traction resistance may be computed using a number of techniques that approximate taking a derivative of a function by examining the change in the value of the function.

As previously discussed, the controller 20 may increase the traction force available by delaying a transmission upshift. This may be accomplished by increasing the motor speed at which an upshift occurs, through adding an offset to the shift point motor speed. In one embodiment, a first offset may be added based on the grade of the road surface 200 (and thus the traction resistance), and a second offset may be added or subtracted based on the change in the grade of the road surface (and thus the change in traction resistance).

Figure 6:
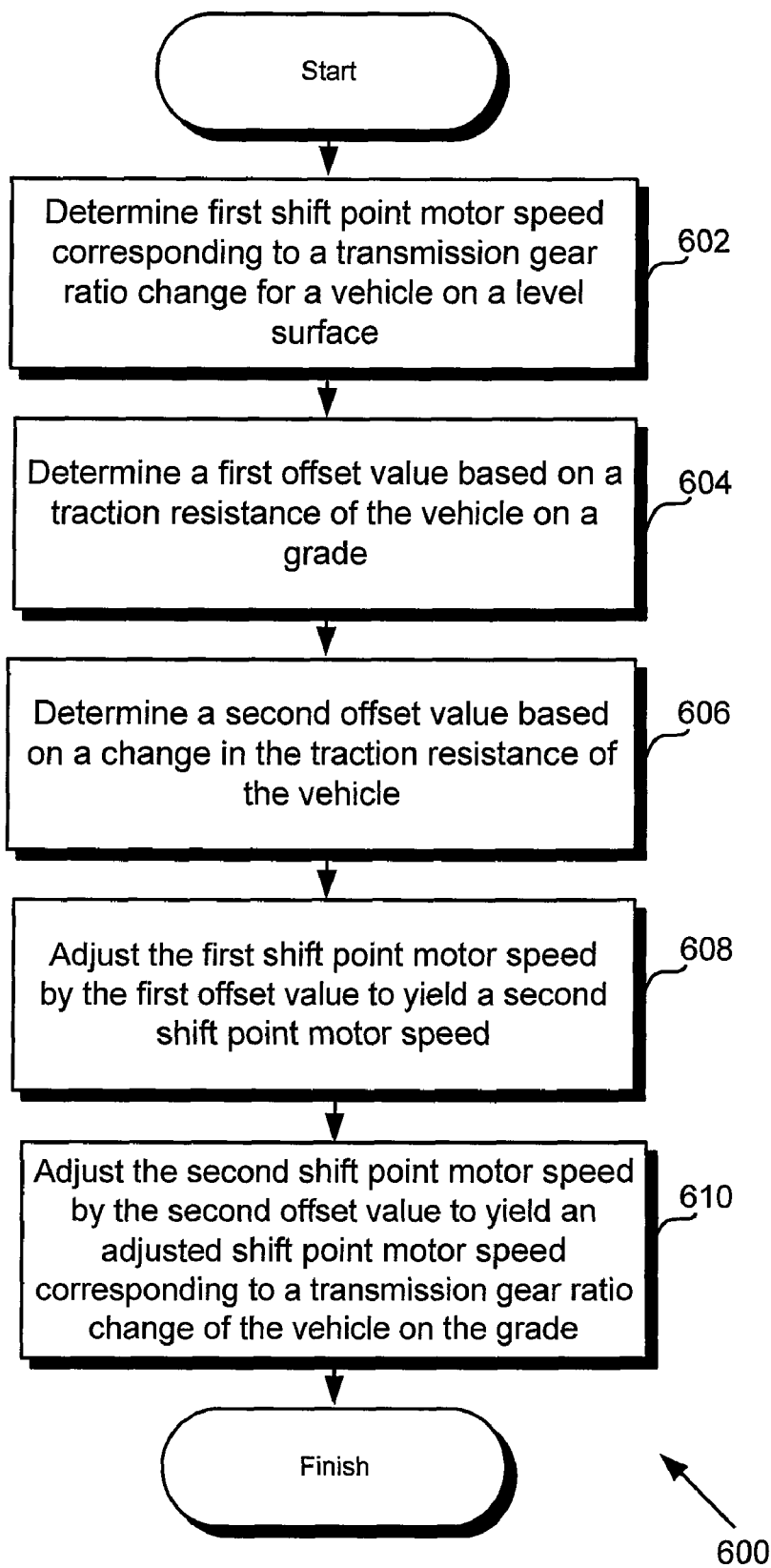
FIG. 6 shows exemplary steps to calculate an adjusted shift point motor speed based on the traction resistance and the change in traction resistance of the vehicle as it ascends a grade.

FIG. 6 shows exemplary steps to calculate an adjusted shift point motor speed based on the traction resistance and the change in traction resistance of the vehicle as it ascends a grade. Control begins at step 602, where a first shift point motor speed is determined. The first shift point motor speed may correspond to a transmission gear ratio change for a vehicle on a level surface. This value may be retrieved from a storage device located in the vehicle, or may be calculated using a number of operating parameters of the vehicle, such as throttle input, vehicle speed, and motor speed. Control passes to step 604, where a first offset value is determined based on a traction resistance of the vehicle on a grade. The traction resistance of the vehicle is calculated, and a corresponding offset value is determined based on the calculated traction resistance. This first offset value may be expressed in a number of motor revolutions per minute, and may be retrieved from a lookup table stored in the controller 20.

At step 606, the first shift point motor speed is adjusted by the first offset value to yield a second shift point motor speed. At step 608, the second shift point motor speed is adjusted by the second offset value to yield an adjusted shift point motor speed that corresponds to a motor speed where a transmission gear ratio change of the vehicle while travelling on the grade. The steps 600 then finish. The controller 20 may order a transmission upshift if the current motor speed is above the adjusted shift point motor speed. The calculation shown in the exemplary steps 600 may be repeated by the controller 20, such as at a periodic interval, to calculate an adjusted shift point motor speed a number of times during the vehicle's ascent of a grade. While the steps 600 show an adjusted shift point motor speed calculated using a first offset based on traction resistance, and a second offset based on the change in traction resistance, an adjusted shift point motor speed may also be calculated with just one of these offsets and not the other.

Figure 7:
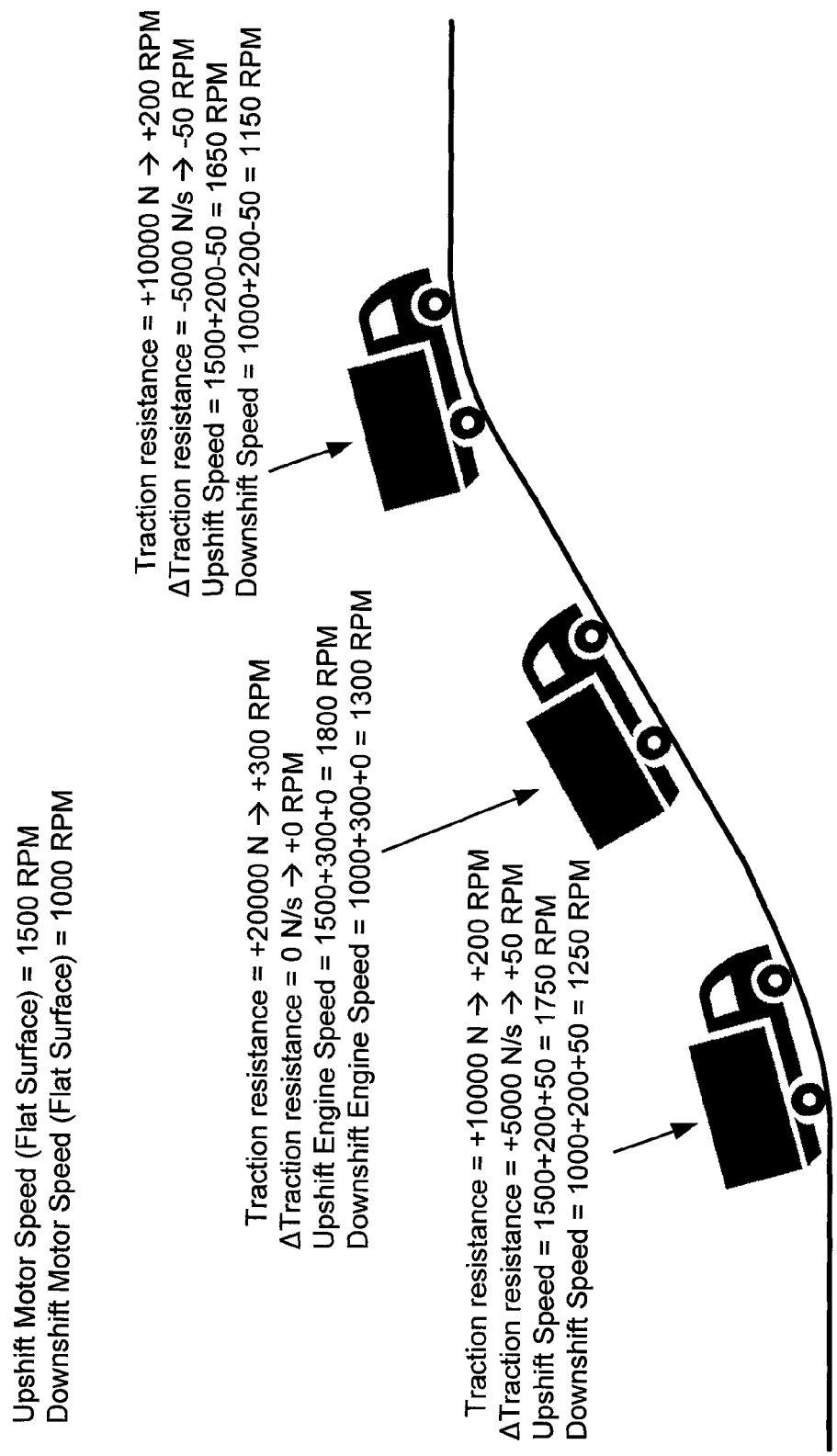
FIG. 7 shows the results of exemplary calculations of an adjusted shift point motor speed during a vehicle hill climb.

FIG. 7 shows the results of exemplary calculations of an adjusted shift point motor speed during a vehicle hill climb. On a level surface, the vehicle transmission downshifts at a motor speed of 1000 revolutions per minute, and upshifts at a motor speed of 1500 revolutions per minute. Table 3 shows an exemplary first offset adjustment to a shift point motor speed based on a calculated traction resistance when ascending a grade 200.

TABLE 3

| Traction resistance [N] | 0 | 5000 | 10000 | 20000 | 30000 |
|---|---|---|---|---|---|
| Number of revolutions offset [1/min] | 0 | 100 | 200 | 300 | 400 |

Table 4 shows an exemplary second offset adjustment to a shift point motor speed based on a calculated change in traction resistance when ascending a grade 200.

TABLE 4

| Gradient traction resistance [N/s] | −10000 | −5000 | 0 | +5000 | +10000 |
|---|---|---|---|---|---|
| Number of revolutions offset [1/min] | −100 | −50 | 0 | +50 | +100 |

The offset adjustment tables may be stored in a memory in the controller 20 or are otherwise accessible to the controller 20. In the first situation shown in FIG. 7, the vehicle 10 is beginning to climb the hill. While the traction resistance (determined to be 10000N) has not reached a maximum, it is increasing rapidly (at the rate of 5000N/s). The controller 20 may utilize the information in Table 3 and Table 4 and determine that a positive offset to the shift point motor speed is required, based on both the current traction resistance and the current change in traction resistance. Hence, offset values of 200 revolutions per minute and 50 revolutions per minute are added to the downshift shift point motor speed of 1000 revolutions per minute, to yield a downshift adjusted shift point motor speed of 1250 revolutions per minute. These adjustments to the downshift speed facilitate a downshift if the vehicle approaches the base of a grade with a motor speed at the lower end of the operating range. When the prime mover includes an internal combustion engine, the early downshift may avoid engine lugging if motor speed drops as the vehicle transitions from a flat surface to a grade. The positive offset based on the current change in traction resistance may act in the first situation to facilitate a downshift that may not have occurred if the downshift shift point motor speed was adjusted based on the traction resistance alone.

Similarly, offset values of 200 revolutions per minute and 50 revolutions per minute are added to the upshift shift point motor speed of 1500 revolutions per minute, to yield an upshift adjusted shift point motor speed of 1750 revolutions per minute. These adjustments act to avoid an undesirable upshift (with a corresponding loss of torque and thus traction force at the wheels) that may have occurred just as the vehicle begins to climb a hill. Specifically, the positive offset based on the current change in traction resistance may act in the first situation to avoid an upshift that may have occurred if the upshift shift point motor speed was adjusted based on the traction resistance alone.

In the second situation shown in FIG. 7, the vehicle 10 is in the middle of climbing the hill. The traction resistance (determined to be 20000N) has reached a maximum, and is not changing as a function of time. The controller 20 may determine that a positive offset to the shift point motor speed is required, based on the current traction resistance. No offset is required based on the current change in traction resistance. Hence, offset values of 300 revolutions per minute and 0 revolutions per minute are added to the downshift shift point motor speed of 1000 revolutions per minute, to yield a downshift adjusted shift point motor speed of 1300 revolutions per minute. Similarly, offset values of 300 revolutions per minute and 0 revolutions per minute are added to the upshift shift point motor speed of 1500 revolutions per minute, to yield an upshift adjusted shift point motor speed of 1800 revolutions per minute. This adjustment acts to avoid or delay an undesirable upshift (with a corresponding loss of torque and thus traction power at the wheels) that may have occurred if the original shift point motor speed was used to determine when an upshift should occur. Stated another way, whereas an earlier upshift may be appropriate on level ground in order to improve fuel economy, a delayed upshift may increase the traction force available to the vehicle when climbing a grade 200 by allowing the transmission to remain in a lower gear, at the expense of a higher motor speed and reduced fuel economy.

In the third situation shown in FIG. 7, the vehicle 10 has nearly completed climbing the grade. While the traction resistance (determined to be 10000N) is not yet zero, it is decreasing rapidly (at the rate of 5000N/s). The controller 20 may determine that a positive offset to the shift point motor speed is required based on both the current traction resistance, but that a negative offset to shift point motor speed is required based on the current change in traction resistance. Hence, a first offset value of 200 revolutions per minute is added to the downshift shift point motor speed of 1000 revolutions per minute, and a second offset value of 50 revolutions per minute is subtracted from the downshift shift point motor speed, to yield a downshift adjusted shift point motor speed of 1150 revolutions per minute. These adjustments to the downshift motor speed facilitate a downshift if the vehicle motor speed approaches the lower end of the operating range. When the prime mover includes an internal combustion engine, the early downshift may avoid engine lugging if motor speed drops as the vehicle travels up the grade. However, as compared to the first situation, the negative offset based on the current change in traction resistance acts in this situation avoid a downshift that may have occurred if the downshift shift point motor speed was adjusted based on the traction resistance alone. As previously stated, a transmission downshift may be undesirable as the vehicle nears the top of a grade, as the vehicle may require less traction force to maintain a relatively constant speed on the decreasing slope of the road surface. An unnecessary transmission downshift may also reduce fuel economy. The negative adjustment to the downshift motor speed acts to avoid unnecessary transmission downshifts as the vehicle nears the top of a grade.

Similarly, a first offset value of 200 revolutions per minute is added to the upshift shift point motor speed of 1500 revolutions per minute, and a second offset value of 50 revolutions per minute is subtracted from the upshift shift point motor speed, to yield an upshift adjusted shift point motor speed of 1650 revolutions per minute. As in the first situation, the adjustment acts to avoid an undesirable upshift (with a corresponding loss of torque and thus traction power at the wheels) while the vehicle is still climbing the grade. However, as compared to the first situation, the lower adjusted shift point motor speed in this situation is a recognition that an upshift may still be somewhat desirable because the vehicle is close to the top of the grade, and the traction power requirements of the vehicle are decreasing as a function of time. By applying an offset based on the change in traction resistance, an earlier upshift may be achieved in some circumstances, potentially increasing the fuel economy of the vehicle.

Thus, an improved method and system has been disclosed for determining if a transmission gear ratio change is required. When climbing a grade, the traction force required to maintain vehicle speed is dependent on the degree of incline of the road surface 200, the wind or air resistance, and the rolling resistance of the vehicle. The sum of these resisting forces may be referred to as the traction resistance. A controller may incorporate the grade of the road surface 200 and/or the change in the grade of the road surface 200 when determining whether a transmission gear ratio change is required. These additional vehicle operating conditions can be incorporated by adjusting the shift point motor speed that the controller uses to determine that a transmission upshift is required. This may be accomplished by increasing the motor speed at which an upshift occurs by an amount corresponding to the traction resistance. An increased shift point motor speed may result in a delayed transmission upshift.

A controller may also utilize the change in traction resistance to anticipate the future traction force needed at the wheels. At the beginning of a hill, the traction force required to maintain vehicle speed is a relatively small, but growing value. By adjusting the shift point motor speed in response to the change in the grade (and thus the change in traction resistance), the controller may avoid erroneous upshifts commanded at the beginning of a hill, where the grade is relatively small, but rapidly increasing. At the top of a grade, the traction force required to maintain vehicle speed may be relatively large, but decreasing rapidly. A controller using information on the change in traction resistance may also direct an earlier upshift at the top of a grade than would otherwise be possible if only the traction resistance information is used to calculate the adjusted shift point motor speed. By allowing a comparatively earlier upshift at the top of a grade, fuel economy of the vehicle may be improved.

Returning briefly to FIG. 1, while the foregoing description of the embodiments is made with reference to a vehicle including an automatic manual transmission and clutch operated by a controller, the methods and systems disclosed herein are similarly applicable to a vehicle that incorporates an automatic transmission and torque converter instead. In vehicle systems that incorporate automatic transmissions, a controller may select of a shift point motor speed for the automatic transmission. Hence, the methods for adjusting the shift point motor speed when ascending a grade may also be utilized in vehicles with automatic transmissions configured by a controller as well.

Although the invention has been described with respect to various system and method embodiments, it will be understood that the invention is entitled to protection within the full scope of the appended claims.

The invention claimed is:

1. A vehicle, comprising:
 a prime mover;
 a transmission operative to couple power from the prime mover to a transmission output at a plurality of different gear ratios;
 a sensor, operative to measure a value indicative of a traction resistance of the vehicle on a grade; and
 a controller, in communication with the sensor and the transmission, operative to:
  select a first gear ratio of the transmission;
  determine a shift point motor speed, wherein the shift point motor speed is the motor speed at which the transmission changes from one fixed gear ratio to a different fixed gear ratio in a stepped fashion, comprising:
   determining a first intermediate shift point motor speed corresponding to a transmission gear ratio change for the vehicle on a level surface;
   receiving from the sensor the value indicative of the traction resistance;
   determining a first offset value based on the traction resistance of the vehicle on the grade;
   determining a second offset value based on a change in the traction resistance of the vehicle on the grade;
   adjusting the first intermediate shift point motor speed by the first offset value to yield a second intermediate shift point motor speed; and
   adjusting the second intermediate shift point motor speed by the second offset value to yield the shift point motor speed corresponding to a transmission gear ratio change of the vehicle on the grade from the first gear ratio to a second gear ratio of the transmission; and
  initiate the transmission gear ratio change from the first gear ratio to the second gear ratio when a motor speed of the internal combustion motor is about equal to the shift point motor speed.

2. The vehicle of claim 1, wherein the controller is further operative to determine the traction resistance of the vehicle.

3. The vehicle of claim 1, wherein the controller is further operative to determine the change in the traction resistance of the vehicle.

4. The vehicle of claim 1, further comprising a lookup table of data stored on a memory, wherein determining the first offset value comprises retrieving from the lookup table an offset value corresponding to the traction resistance.

5. The vehicle of claim 1, further comprising a lookup table of data stored on a memory, wherein determining the second offset value comprises retrieving from the lookup table an offset value corresponding to the change in traction resistance.

* * * * *